May 31, 1949.  C. D. BRANSON  2,471,514
SAFETY TYPE THERMOSTAT
Filed July 20, 1945
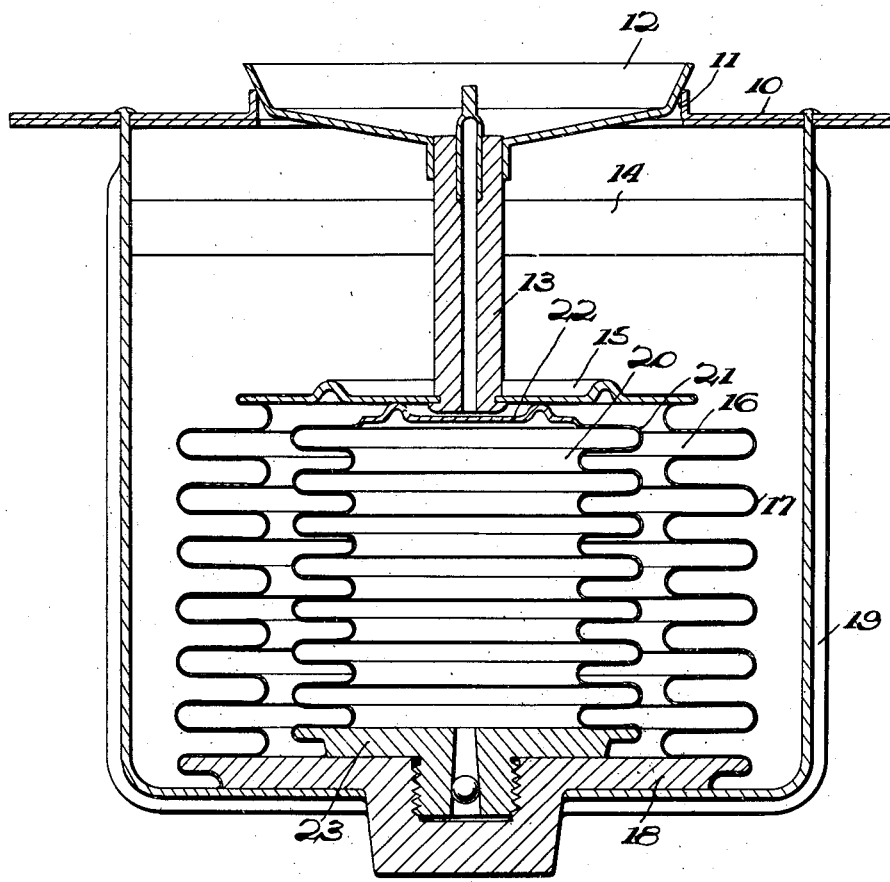
Inventor
Charles D. Branson.
By Cameron, Kerkam & Sutton.
Attorneys Patented May 31, 1949

2,471,514

UNITED STATES PATENT OFFICE 2,471,514

SAFETY TYPE THERMOSTAT

Charles D. Branson, Knoxville, Tenn., assignor to Robertshaw-Fulton Controls Company, a corporation of Delaware Application July 20, 1945, Serial No. 606,194

6 Claims. (Cl. 297—8)

This invention relates to thermostats, and more particularly to thermostats which are so constructed that upon failure they will move the element controlled by the thermostat to a position of safety.

Safety type thermostats have long been known wherein the thermostat is charged with a fluid at a sub-atmospheric pressure, so that at all temperatures below that at which the controlled element is in its position corresponding to a position of safety the pressure of the fluid interiorly thereof is below the ambient pressure, resiliency in the fluid-confining wall, as in the case of bellows thermostat employing a resilient corrugated tubular wall, or supplied by a spring, effecting the expansion of the thermostat, as the temperature rises, by overcoming the differential between the external and internal pressures, which differential is a function of the ambient pressure. Due to the flat slope of the temperature-vapor-pressure curve of fluids conventionally used for charging purposes to produce sub-atmospheric pressures within the operating temperature range of the thermostat, the foregoing type of construction is not entirely satisfactory where there are substantial variations in the back pressure acting on the thermostat or where such back pressure may be relatively high, as for example in the case of an automobile thermostat used with a cooling system employing a pressure cap.

It is an object of this invention to provide a thermostat which moves to safety position upon failure and which is less affected by back pressures.

Another object of this invention is to provide a device of the type characterized which is less affected by variations of back pressure or ambient pressure.

Another object of this invention is to provide a device of the type characterized which enables use of a lower-boiling-point charging fluid so that a steeper portion of the vapor-pressure curve may be utilized for the effective range of the thermostat.

Other objects of the invention will appear as the description thereof proceeds.

The invention is capable of receiving a variety of mechanical expressions only one of which is shown on the accompanying drawing, and it is to be expressly understood that the drawing is for purpose of illustration only and is not to be construed as a definition of the limits of the invention, reference being had to the appended claims for that purpose.

The drawing shows diagrammatically one embodiment of the present invention wherein a safety thermostat in conformity with the invention is applied to valve actuation in a thermostatic valve unit of the type commonly used in automobile regulators. It is to be expressly understood, however, that the invention may be embodied in any other suitable type of thermostatically operated valve mechanism or in a thermostat for operating any other suitable type of control. The invention will be described as embodied in a vapor type thermostat, but as will be apparent to those skilled in the art the invention may also be applied to the liquid expansion type of thermostat.

Referring in detail to the drawing, 10 designates a plate having a flanged opening 11 to provide a valve port. Cooperating with said port is a valve member 12 of any suitable construction which may be taken as typical of any suitable means to be controlled. Member 12 is connected by stem 13, which is guided by suitable guide means 14, to the movable end wall 15 of an expansible and collapsible chamber 16 whose periphery is shown as defined by an expansible and collapsible corrugated tubular metal wall or bellows 17 and whose stationary end wall 18 is suitably supported from a stationary part of the unit as by a strap 19 carried by the plate 10. Interiorly of said chamber 16 is a second expansible and collapsible chamber 20 whose periphery is shown as defined by a corrugated expansible and collapsible tubular metal wall or bellows 21 having a movable end wall 22 engaged with but unattached to said end wall 16 and a stationary end wall 23 carried by the strap 19 and shown as secured to the end wall 18. Bellows 17 preferably has the same mean effective area as the valve port 11.

The chambers 16 and 20 are assembled one inside the other with their natural free lengths such that the valve member 12 is in wide open position when the parts are assembled into the valve unit. Inner chamber 20 is then charged with any suitable thermosensitive fluid, as by partially filling the same, preferably at atmospheric pressure, with a vaporizable liquid having vapor pressure characteristics consistent with the desired operating range. Chamber 16 is then evacuated in the sense that the air is largely exhausted so as to produce a vacuum as that term is used commercially, and the chamber is then hermetically sealed. External pressure acting on movable end wall 15 will then collapse chamber 16 and move valve member 12 tightly onto its seat against the resilience of the bellows 17 and 21, or a spring may be provided if preferred.

With increase of temperature the vapor pressure in chamber 20 will increase, expanding said chamber with its movable end wall 22 moving movable end wall 15 to actuate valve member 12, the differential between external and internal pressures acting on chamber 16 constituting a load opposing expansion of chamber 20. As the port area 11 is preferably equal to the mean effective area of bellows 17 variations in pressure are balanced on the valve member 12 and the bellows 17. Owing to the loading of chamber 20 by evacuated chamber 16, the chamber 20 may be charged with a fluid of lower boiling point than could be used in the absence of such loading, whereby the effective range of the thermostat can be selected at a steeper portion of the pressure vapor curve and the effect of ambient or back pressures minimized.

If either of chambers 16 or 20 leak or either of the bellows fails the thermostatic unit moves the valve member 12 to wide open position. Thus if chamber 16 leaks its internal vacuum is broken and bellows 17 either by reason of its inherent resilience, or by the action of a spring if preferred, will move valve member 12 to wide open position upon equalization of the interior and exterior pressures acting on chamber 16. If chamber 20 leaks its contained fluid is discharged into chamber 16, breaking the vacuum therein and applying the pressure of the vapor of the liquid from chamber 20 to the larger area of movable end wall 15 and thereby moving valve member 12 to wide open position.

While the embodiment of the invention illustrated on the drawing has been described with considerable particularity it will now be apparent to those skilled in the art that the invention may take a variety of mechanical expressions, and changes may be made in matters of size, details of construction, types of thermostat, units in which the thermostats are employed, etc., without departing from the spirit of this invention. Reference is therefore to be had to the appended claims for a definition of the invention.

What is claimed is:

1. In a device of the character described, in combination with means to be controlled, an expansible and collapsible chamber having a movable wall operatively connected to said means and charged with gas under a vacuum, a second expansible and collapsible chamber within said first named chamber and charged with a vaporizable liquid, said second named chamber having a movable wall with which said first named movable wall is held in engagement by the difference in external and internal pressure acting on said first named chamber, said second named chamber being the sole means for expanding said first named chamber through the engagement of said movable walls as long as a vacuum remains in said first named chamber.

2. In a device of the character described, in combination with means to be controlled, an expansible and collapsible chamber having a movable wall operatively connected to said means and charged with gas under a vacuum, and a second expansible and collapsible chamber within said first named chamber and charged with a vaporizable liquid, said second named chamber having a movable wall with which said first named movable wall is held in engagement by the difference in external and internal pressure acting on said first named chamber, said second named chamber being the sole means for expanding said first named chamber through the engagement of said movable walls as long as a vacuum remains in said first named chamber and said first named chamber having a corrugated expansible and collapsible peripheral wall whose free length is such that its movable wall is moved to safety position on equalization of the internal and external pressure acting on said first named chamber.

3. In a device of the character described, in combination with means to be controlled, an expansible and collapsible chamber having a movable wall operatively connected to said means and charged with gas under a vacuum, and a second expansible and collapsible chamber within said first named chamber and charged with a vaporizable liquid, said second named chamber having a movable wall with which said first named movable wall is held in engagement by the difference in external and internal pressure acting on said first named chamber, said second named chamber being the sole means for expanding said first named chamber through the engagement of said movable walls as long as a vacuum remains in said first named chamber and said first named movable wall being larger than said second named movable wall and operable to move said means to be controlled to a safety position upon escape of liquid from said second named chamber into said first named chamber to develop a vapor pressure of said liquid on the movable wall of said first named chamber.

4. In a device of the character described, in combination with means to be controlled, an expansible and collapsible chamber having a movable wall operatively connected to said means and containing a vacuum, a second expansible and collapsible chamber smaller than and disposed within said first named chamber and charged with a thermosensitive fluid, said second named chamber having a movable wall in engagement with which said first named movable wall is held by atmospheric pressure, said second named chamber being the sole means for expanding said first named chamber as long as said vacuum is maintained in said first named chamber and said first named chamber being expansible independently of said second named chamber upon equalization of the internal and external pressure acting thereon.

5. In a device of the character described, in combination with means to be controlled, an expansible and collapsible chamber having a movable wall operatively connected to said means and containing a vacuum, a second expansible and collapsible chamber smaller than and disposed within said first named chamber and charged with a thermosensitive fluid, said second named chamber having a movable wall in engagement with which said first named movable wall is held by atmospheric pressure, said second named chamber being the sole means for expanding said first named chamber as long as said vacuum is maintained in said first named chamber and said first named chamber having a lateral corrugated wall expansible independently of said second named chamber upon loss of said vacuum to move said means to be controlled to a position of safety.

6. In a device of the character described, in combination with means to be controlled, an expansible and collapsible chamber having a movable wall operatively connected to said means and containing a vacuum, a second expansible and collapsible chamber smaller than and disposed within said first named chamber and charged with a thermosensitive fluid, said second named chamber having a movable wall in engagement with which said first named movable wall is held by atmospheric pressure, said second named chamber being the sole means for expanding said first named chamber as long as said vacuum is maintained in said first named chamber and said first named chamber being expansible independently of said second named chamber upon equalization of the internal and external pressure acting thereon, the movable wall of said outer expansible and collapsible chamber being sufficiently larger than the movable wall of said inner chamber to move said means to be controlled to a position of safety upon application of the pressure of said thermosensitive fluid thereto following leakage of said fluid from said inner chamber to said outer chamber.

CHARLES D. BRANSON.

REFERENCES CITED

The following references are of record in the file of this patent:

UNITED STATES PATENTS

| Number | Name | Date |
|---|---|---|
| 1,109,996 | Kuhlmann | Sept. 8, 1914 |
| 2,129,499 | Landon | Sept. 6, 1938 |